United States Patent [19]

Petersen

[11] Patent Number: 4,558,936
[45] Date of Patent: Dec. 17, 1985

[54] FILM ADVANCING AND PROCESSING APPARATUS

[75] Inventor: Christian C. Petersen, Cambridge, Mass.

[73] Assignee: Polaroid Corporation, Cambridge, Mass.

[21] Appl. No.: 645,836

[22] Filed: Aug. 31, 1984

[51] Int. Cl.[4] .............................................. G03B 17/52
[52] U.S. Cl. .................................. 354/86; 354/173.1; 354/212
[58] Field of Search .................. 354/84, 85, 86, 87, 354/170, 171, 173.1, 212

[56] References Cited

U.S. PATENT DOCUMENTS

| | | | |
|---|---|---|---|
| 3,753,392 | 8/1973 | Land | 95/13 |
| 3,877,045 | 4/1975 | Bloom et al. | 354/275 |
| 3,889,280 | 6/1975 | Biber | 354/86 |
| 3,906,527 | 9/1975 | Erlichman | 354/152 |
| 3,936,847 | 2/1976 | Erlichman | 354/152 |
| 3,943,786 | 3/1976 | Mills | 74/384 |
| 3,967,304 | 6/1976 | Johnson et al. | 354/83 |
| 4,047,192 | 9/1977 | Johnson et al. | 354/83 |
| 4,104,659 | 8/1978 | Douglas | 354/170 |
| 4,231,645 | 11/1980 | Davis et al. | 354/145 |
| 4,268,146 | 5/1981 | Johnson | 354/145 |
| 4,433,273 | 2/1984 | Petersen | 318/135 |

Primary Examiner—A. A. Mathews
Attorney, Agent, or Firm—Leslie J. Payne

[57] ABSTRACT

There is disclosed a film advancing and processing apparatus for use in conjunction with self-developing film units. Included in such an apparatus is a linear actuator which steps a driving belt that selectively operates a rear film pick mechanism and positively increments a drive roller of a pair of spreading rollers. The linear actuator is operatively positioned between upper and lower belt flights of the belt for providing a compact yet efficient drive system which precisely drives the film pick and the processing rollers.

7 Claims, 3 Drawing Figures

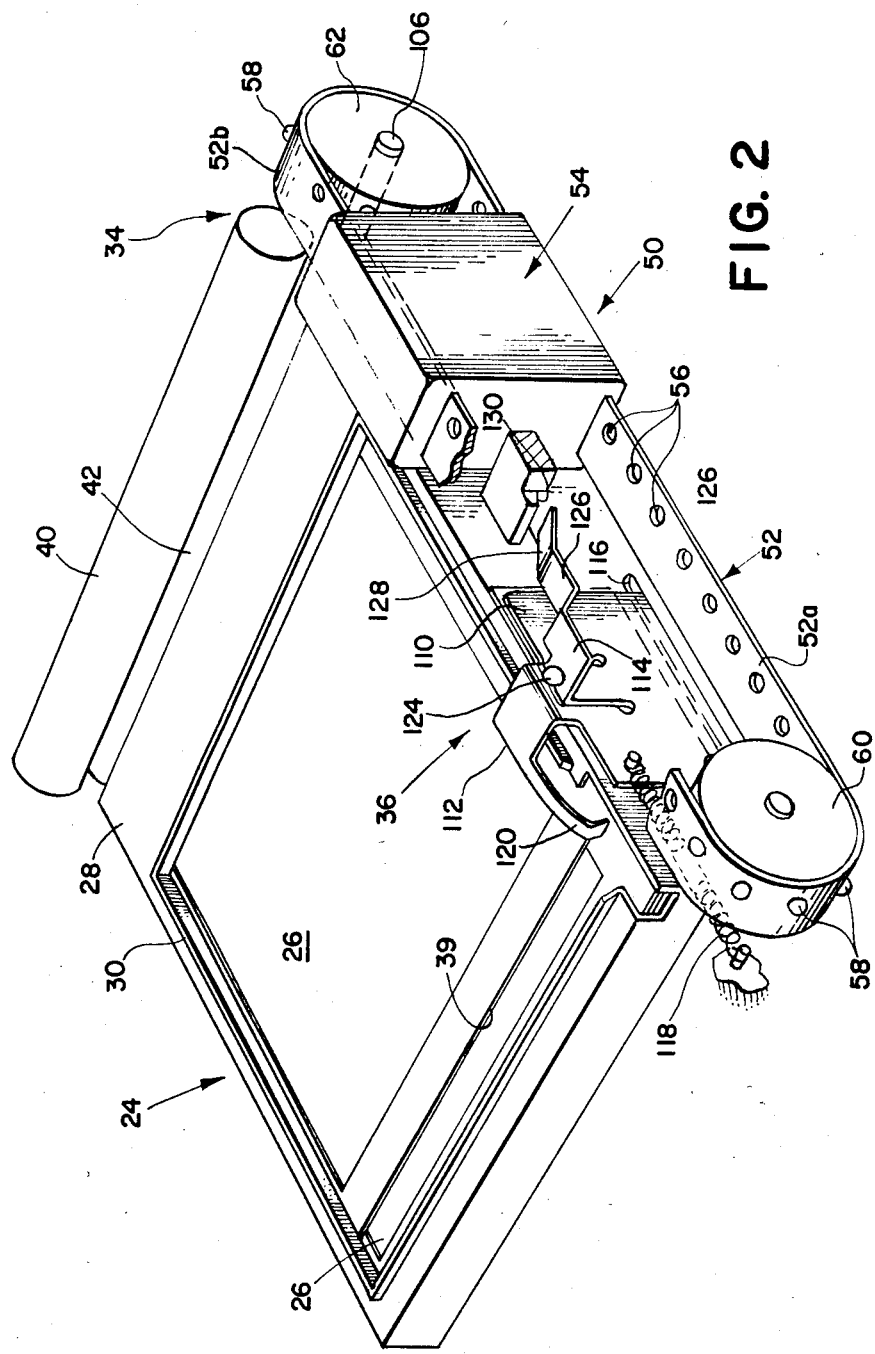

FILM ADVANCING AND PROCESSING APPARATUS

BACKGROUND OF THE INVENTION

This invention relates generally to a compact and simplified system for operating and digitally controlling several functions in a camera, especially cameras of the instant-developing type having film advancing and spreading functions.

Photographic apparatus of the instant-developing type expose and process automatically film units of the self-developing kind. Normally, a plurality of these unexposed units are housed in a stacked array in a film pack located adjacent a pair of pressure applying rollers in the camera body.

Once the film pack is loaded in the camera, the user frames the subject to be photographed, focuses the optical system and presses a button to initiate a cycle of camera operation. The operating cycle includes the step of exposing the uppermost one of the stacked film units under the control of a light-sensing exposure control circuit. Following exposure, the film unit is advanced to the pressure-applying rollers, which are mounted adjacent a camera body exit slot. For advancing the uppermost film unit from the pack after exposure there is provided a film advance pick arrangement. The pick is operable to advance the film unit through a film pack exit slot and into engagement with the rollers. Thereafter, the film is advanced by the rollers, while the latter progressively causes uniform spreading of the processing composition in the film unit. The film unit is also partially ejected from the camera body. Thereafter, the camera mechanisms are reset for the next cycle of camera operation.

There are several known systems for initiating and controlling one or more or all of the above functions. These systems include a battery operated motor which, through a plurality of gears forming a gear train, drives a timing or sequencing wheel, gear or cam. For example, this sequencing wheel cooperates with a spring biased-pick arrangement for allowing the latter to pick the topmost unit from the pack and into engagement with the pressure applying rollers. Also, the sequencing wheel cooperates with the plurality of gears for driving the pressure-applying rollers so as to spread the fluid and advance the unit. Examples of such systems are disclosed in commonly assigned U.S. Pat. Nos.: 3,753,392, 3,943,786 and 4,047,192.

The foregoing systems work quite satisfactorily. However, they require a multiplicity of components. Consequently they are relatively complicated and costly to manufacture, and assemble. As is appreciated readily, increased costs are significant in the highly competitive photographic field. Moreover, such systems generally require relatively significant drains on battery power during a photographic cycle.

Attempts for simplifying the construction and operation of the foregoing kinds of sequencing systems have been undertaken. One is described in commonly assigned U.S. Pat. No. 3,889,280. Included in such a system is a battery powered motor which drives a timing belt. The timing belt drives an intermediary gear which drives the processing rollers. Also, the timing belt controls a cam that operates a mirror and then operates a film picking arrangement. Because several gears have been eliminated less power of the battery is consumed. Also this system requires the motor to be behind the film pack. Thus miniaturization is somewhat impeded. However, with such a motor there is no indexing or stepping of the belt. Hence, with such a system there is a tendency for lack of precision in sequencing. Towards that end the patent discloses the need for special circuitry for minimizing the problem of the motor causing overshooting of the belt and its associated cam member.

SUMMARY OF THE INVENTION

It is an object of the present invention to provide an improved apparatus for use in controlling the performance of several functions in a photographic apparatus, especially of the instant type.

According to the present invention, such an apparatus includes a first assembly operable for initially engaging a film unit at an exposure station and advancing it. The present invention includes a second assembly operable for engaging the advancing unit and effecting the distribution of the fluid in such an advancing film unit. Means are provided for driving both the first and second assemblies. Included in the driving means is a timing belt assembly which is operatively connected to the first and second assemblies. A stepping electromagnetic actuator is coupled to the timing belt assembly and is operable for incrementally steppng the timing belt to thereby facilitate incremental driving of the first and second assemblies.

In an illustrated embodiment the belt assembly is arranged in a loop having upper and lower flights, and the stepping electromagnetic actuator when energized is alternately coupled to opposite flights so as to alternately and incrementally drive each flight in opposite directions. In such an illustrated embodiment, the stepping actuator is operatively disposed between said upper and lower flights so that when energized it selectively drives each of said flights in stepped opposite directions.

In such an illustrated embodiment, the pair of spaced apart pressure applying rollers which make up the second assembly are directly drivingly coupled to the timing belt assembly.

Among the objects of the invention are, therefore, the provision of an improved driving apparatus for use in driving and controlling the operation and sequencing of several components of a photographic apparatus; the provision of an improved apparatus for seletively controlling the film picking assembly and the fluid distribution apparatus; the provision of an improved apparatus of the foregoing type which effects digital incremental displacement of a timing belt, and thereby the film picking assembly and the fluid distribution apparatus; the provision of an improved apparatus which utilizes an electromagnetic stepping acutator between upper and lower flights of the timing belt to thereby form a compact driving and control apparatus; the provision of an improved apparatus of the above noted type wherein the digitally driven belt directly drives one of the processing rollers.

Other objects and further scope of applicability of the present invention will become apparent from the detailed description to follow when taken in conjunction with the accompanying drawing in which like parts are designated by like reference numerals.

BRIEF DESCRIPTION OF THE DRAWINGS

FIG. 2 is an enlarged perspective view showing in greater detail the noted picking and spreading system of the present invention; and, FIG. 3 is an enlarged fragmented cross sectional view of an electromagnetic actuator for use in conjunction with the present invention.

DETAILED DESCRIPTION

Figure 1:
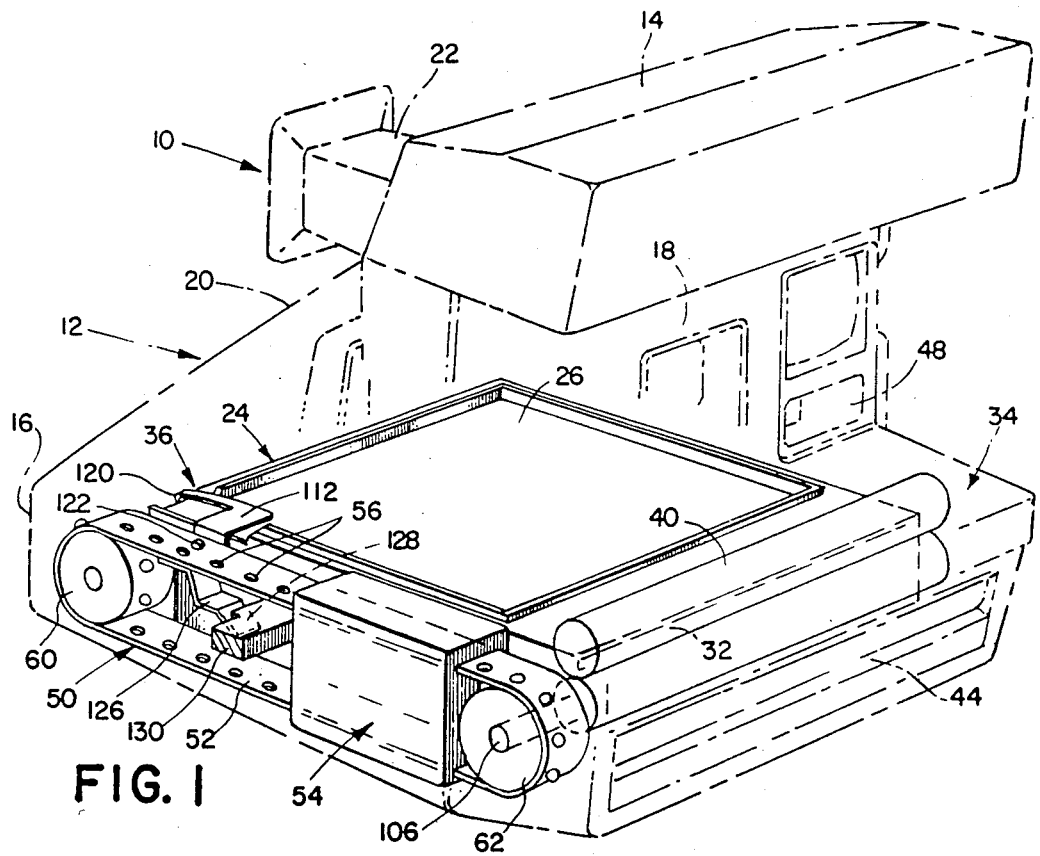
FIG. 1 is a perspective view showing in phantom lines a photographic apparatus including a film picking and spreading system of the present invention.

Reference is made to FIG. 1 of the drawings for illustrating a photographic apparatus 10 of the so called instant type usable with self-developing film units. The photographic apparatus 10 includes a housing 12 having a foldable flash unit 14 of the electronic strobe type pivotally attached thereto. The flash unit 14 is movable between an operative erect position (FIG. 1) and an inoperative non-erect position (not shown). Insofar as details of the photographic apparatus 10 and strobe 14 are concerned, they do not, per se, form an aspect of the present invention. Hence, only those details necessary for an understanding of this invention will be set forth. For a more detailed description thereof, reference is made to commonly assigned U.S. Pat. No. 4,268,146.

With reference to FIG. 1, the housing 12 is seen to have a generally parallelpiped base section 16 for defining, in part, a film pack receiving chamber. Extending upwardly from the base section 16 is a forwardly facing housing section 18. Many of the camera's operational components associated with exposure control and processing operations are retained in the housing section 18. A rear housing section 20 defines as exposure chamber (not shown). Associated with the rear housing section 20 is a rearwardly extending viewfinder lens assembly, generally indicated at 22.

The film pack 24 contains a stacked array of self-developing film units 26 along with a battery (not shown) for powering the camera's electrical circuitry, including the electromagnetic actuator to be later described. An example of such a film pack 24 is described generally in commonly assigned U.S. Pat. No. 3,877,045 issued on Apr. 8, 1975, to S. M. Bloom et al. The film pack 24 includes a standard film container 28 having a rectangular opening 30 through which the uppermost film unit of the stack is exposed. A slot 32 is provided at the forward end of the container 28 through which an exposed film unit is advanced forwardly to a film spreading or processing apparatus 34. As will be explained in greater detail, the film unit 26 will be advanced by a film advancing or picking mechanism 36. The processing apparatus 34 operates to rupture the processing pod (not shown) in the film unit 26, and spread the discharged processing fluid across the image format area of the unit. Also, one rear corner of the container 28 is cut-away, as shown at 38, for facilitating the pick mechanism 36 engaging the rear edge 39 of the film in a manner which will be described more fully hereinafter.

Reference is made in particular, to the fluid processing apparatus 34 of the present invention. As shown it includes a pair of conventional processing rollers 40, 42. These rollers 40, 42 are journalled for rotation in juxtaposed relationship to one another so that the nip therebetween is situated adjacent the film pack exit slot 32. When the film exits the slot 32, as a result of picking, the rollers 40, 42 can apply sufficient compressive forces to the unit for rupturing the fluid pod and, thereby spreading the discharged fluid uniformly over the image area. As will be explained, the rollers 40, 42 are precisely digitally driven for continuously advancing the film unit through a camera body slot 44 to the exterior of the camera following the picking action.

A film exposure means of the photographic apparatus 10 includes an objective lens 46 mounted in the forward housing wall 18. A shutter mechanism, not shown, is mounted behind the lens 46 for regulating the transmission of image forming light in the exposure chamber. Light rays passing through the lens 46 and an aperture defined the shutter mechanism are incident upon a reflex mirror, not shown, mounted at an appropriate angle on the interior surface of a rear housing wall 20 for directing the light rays onto the image forming area at the film plane. The forward wall 18 may include other elements associated with automatic exposure control, such as a photocell window 48. Insofar as details of the structure and function for effecting film exposure are concerned, they do not, per se, form an aspect of the present invention. Hence, only those details believed necessary for an understanding of the invention have beenset forth. Reference is made to commonly-assigned U.S. Pat. No. 4,231,645 for a more detailed description of an exposure control for use in conjunction with a camera usable in this invention.

Reference is now made to the driving system 50 of the present invention which is best shown in FIGS. 1 and 2. Essentially, the driving system 50 when operable initiates and controls the sequential operation of several important components of the photographic apparatus. In this embodiment, the driving system 50 inititates and controls operation of the film advancing apparatus 36 and the film processing apparatus 34. Although only the foregoing operations are described as being controlled for use in the camera, it will be understood that other camera functions can be controlled.

Figure 3:
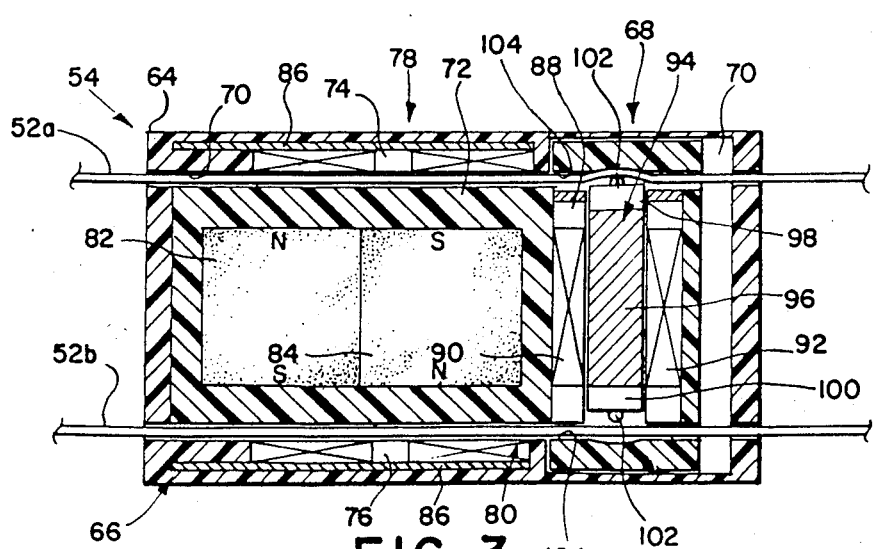

In this embodiment, the driving system 50, includes a timing belt 52 and a digitally controlled stepping actuator 54 which is operable to incrementally and precisely step the timing belt 52. In this regard, the timing belt 52 has upper and lower flights 52a, 52b; respectively, which run along a closed path adjacent the film pack 24. The belt 52 has linearly spaced openings 56 which cooperate with projections 58 that are on idler wheel 60 and driving wheel 62; such as shown in the drawings. The stepping actuator 54, as shown in greater detail in FIG. 3 is essentially of the type described in commonly assigned U.S. Pat. No. 4,433,273 issued to the inventor of the instant application on Feb. 21, 1984, and entitled "Camera Motor Belt Drive System". Details of the actuator 54, per se, do not form an aspect of the present invention. Hence, only those details necessary for an understanding of this embodiment will be set forth.

In this regard, the stepping actuator 54 includes a rectangular frame 64 formed of nonconductive, nonmagnetic material. Included in the stepping actuator 54 is a drive motor 66 and a clamp motor 68. In this particular embodiment the frame 64 is arranged adjacent the film pack 24 such that it cooperates with the upper and lower flights 52a,b, such as shown in FIGS. 1-3. Formed interiorly of the frame 64 is a generally linear cavity 70 within which a primary armature 72 of the drive motor 66 is supported for reciprocating movement. The body of the armature 72 is also formed of a nonconductive and nonmagnetic material, preferably, having a low coefficient of friction. In this manner the sliding movement of the armature 72 is facilitated. Although not shown, longitudinal guideways or guiderail projections can be formed on the armature 72 so as to cooperate with the interior surfaces of the forming of the cavity.

A pair of essentially planar bobbins 74 and 76 are fixedly supported in the frame 64 so that the mutual facing ends thereof are substantially flush with the longitudinal surfaces defining the cavity 70. The bobbins 74, 76 support planar coils 78, 80 of conductive windings which define an energizable field assembly.

Fixed within the armature 72 is a pair of adjacent rectangular permanent magnets 82 and 84 preferably of the rare earth type, such as samarium cobalt. The transverse dimensions of the magnets (not shown) approximate the armature 72. The polarity of both magnets are as shown in the FIG. 3. More particularly, the commonly facing surfaces of both magnets have alternating polarity. In this embodiment magnet 82 has its north pole facing upwardly, whereas magnet 84 has its south pole facing upwardly. Also formed interiorly of the frame 64 is a pair of soft iron plates 86 which are respectively associated on the opposite side of the coil from the magnets. The plates 86 provide low reluctance paths for the magnetic flux travelling between the opposing poles of the magnets.

As described more fully in the last noted patent, whenever current is travelling in the upper coil 78 in a preselected direction it will exert a force on the armature 72 such that the latter will move from leftwardly to rightwardly in the frame 64. Conversely passage of electric current through the lower coil 80, opposite in direction to that of the coil 78, will exert a force driving the armature 72 rightwardly to leftwardly. Hence, the armature 72 can be bi-directionally driven in a manner dependent upon the polarity of the current flowing in the conductive windings of the noted coil 78, 80. Of course, the coils are alternately energized for effecting longitudinal reciprocation.

Adjacent one end of the armature 72 is the clamping motor 68. This motor 68 is supported by the armature 72. The clamp motor 68 includes a bobbin 88 carrying a pair of circular coils 90 and 92 which are wound simultaneously to occupy the same area. These coils 90, 92 extend about the cylindrical armature 94 which has a steel core 96 as well as a pair of permanent magnets 98 and 100. The magnets 98, 100, as with the previously described magnets, are preferably of the rare earth type, such as samarium cobalt. In the illustrated embodiment, the armature 94 is provided at opposite ends with projection 102. The projections 102 move into engagement alternately with belt flights 52a and 52b. The projections 102 are aligned with recesses formed in the surfaces of the longitudinal slots 104 which are formed in the armature 72. By reason of such an arrangement the projections 102 cooperate with the recesses to grip the belt flights 52a,b by allowing the projections 102 to cooperate with openings 56. Although not shown, circuit means are provided for energizing the system for effecting reciprocal motion of the armature 72 and the alternate clamping of the clamp motor 68 in a manner so as to synchronize movement of the armature 72 with the appropriate engagement at the belt 52 by the clamp motor 68.

To move the armature 72 rightwardly, the coils 78 and 90 are simultaneoulsy energized. The result is that the armature 72 will be advanced to an end stop defined by the frame 64. The motor 68 will cause gripping of the belt flight 52a by the projections 102. Thus, the belt flight 52a will be moved rightwardly by a step equal to the distance or throw of the armature 72. Because the belt flight 52b is of the same belt as the flight 52a, obviously, the flight 52b will move in the opposite direction. To initiate the next step, the coils 78 and 90 are deenergized, while the coils 80 and 92 are energized. In this situation the armature 72 will be driven leftwardly until it engages stop defined by the frame. During this movement, the motor 68 is energized so that a projection 102 cooperates with an opening 56 in the flight 52b. Thus, leftward movement of the armature 72 is transmitted to the belt 52. Repetitions of this sequence of operations will advance the belt 52 in stepped increments. The foregoing actuator 54 provides a highly efficient and extremely responsive device which does not need a braking circuit because there is little likelihood of having the belt overshoot after each step since after each step the motor comes to zero velocity. Such a motor is operated by a suitable primary power source, such as the battery in the film pack.

As the belt 52 is advanced in such a manner, it will positively drive the driving wheel 62. The driving wheel 62 is attached to drive shaft 106 of the roller 42. As is known rotation of the roller 42 causes rotation of roller 40.

Reference is now made to the film advancing or picking mechanism 36 of the present invention. Particular reference is made to FIG. 3 for showing the cooperation between the timing belt and the film picking or advancing mechanism 36.

In particular, the film advancing mechanism 36 includes a pick assembly which is defined by an intregal carrying plate 110 that includes a film pick member 112 and a resilient belt engaging member 114. The carrying plate 110 is supported for sliding movement in a linear slot 116 formed in the camera housing 12. A spring 118 biases the plate 110 rearwardly when the belt engaging member 114 is disengaged from the timing belt 52. The film picking member 112 includes a rearwardly extending finger 120 which is arranged to engage the rear edge 39 of the topmost film unit 26 in the film pack 24 and advance such film unit a distance which is equal to the throw of the pick member. This is, of course, determined by the distance the belt engaging member 114 is engaged and advanced with the belt 52. The belt engaging member 114 is inherently biased resiliently upwardly so as to engage the bottom surface of the upper flight 52a. When the advance opening 122 in the belt overlaps the projection 124, the latter is urged into registry therewith. Since the belt 52 is moving, the plate 110 and the belt engaging member 114 move therewith, along with, of course, the film picking member 112. The film unit 26 will be advanced until it engages the pressure applying rollers 40, 42, whereby the latter will continue to advance the film unit 26 and spread the fluid as is normally done. For terminating the picking action, there is provided disengaging means. The disengaging means includes a disengaging finger 126 which is integrally connected to the belt engaging member 114. During the picking action, a distal end 128 of the finger engages a camming member 130 with an inclined surface which is fixed to the housing. Engagement of the distal end 128 with the camming member 130 causes the belt engaging member 114 to bend downwardly thereby releasing the projection 124 from the opening 122. The return spring 118 becomes active to return the plate 110 to its original position. The foregoing described structure is but one embodiment of a mechanism for selectively interconnecting the belt with the film picking mechanism.

From the foregoing description, it is believed the operation of the foregoing drive system for driving the belt assembly in a step by step manner is adequately set forth. To supplement such description, however, the following is set forth. For advancing a film unit 24 subsequent to exposure, the actuator 54 is selectively operated so that the belt 52 incrementally advances from left to right. At the same time the motor 68 is energized selectively so that its projections 102 alternately cooperate with the openings 56. As this occurs the upper flight will move rightwardly, while the lower flight moves leftwardly. As noted, the pick assembly will be moved in conjunction with the belt 52 whenever the projection 124 registers with the opening 122. The film unit is advanced rightwardly by the pick finger 120 until the film becomes drivingly engaged by the processing rollers 40, 42. The disengaging means becomes operative to effect release of the belt engaging member 114, whereupon the return spring 118 returns the plate 110 to its original position. The processing rollers 40, 42 are driven as noted, by the belt 52 in a step by step fashion. Advantageously, the foregoing going apparatus serves to precisely operate the components because of the precise incrementing of the belt 52. With such a system there is no need to provide a coasting or braking system along with the associated circuitry. Additionally, such braking or coasting systems generally require the use of mechanical pawl or ratchet systems. These are designed to effectively limit the problems of coasting which otherwise would adversely affect the desired incremental displacement needed for a precision apparatus of the type mentioned.

Since certain changes may be made in the above described method and apparatus without departing from the scope of the invention herein involved, it is intended that all matter contained in the description or shown in the drawings be considered illustrative and not limiting.

What is claimed is:

1. Apparatus for use in photographic apparatus of the type usable with a self-developing film unit having releasable processing fluid associated therewith comprising:
    first means operable for initially engaging the film unit at an exposure station following exposure and advancing the film unit therefrom;
    second means operable for engaging the film unit as it is advanced from said exposure station and effecting the release and spreading of the fluid across the film unit; and,
    means for driving both said first and second means;
    said driving means includes a timing belt assembly which is operatively connected to said first means, and said second means and a stepping electromagnetic actuator which is coupled to said timing belt assembly for incrementally steppng said timing belt to thereby facilitate incremental driving of said first and second means.

2. The apparatus of claim 1 wherein said belt assembly includes upper and lower flights, and said stepping electromagnetic actuator when energized is alternately coupled to opposite ones of said upper and lower flights so as to alternately and incrementally drive each of said flights in opposite directions with respect to each other.

3. The appartus of claim 2 wherein said stepping actuator is operatively and selectively connected to and between said upper and lower flights.

4. The apparatus of claim 2 wherein said first means includes a film pick assembly which is selectively connected to said timing belt for at least a preselected portion of an operating cycle so as to drive the film unit from the exposure station following exposure, said pick assembly including a picking member which positively engages said timing belt during the preselected portion and means for causing disengagement of said picking member from said belt at the end of the preselected portion whereby picking of the film unit ceases.

5. The apparatus of claim 3 wherein said belt is provided with a pick assembly opening, and said picking member is biased to ride against a surface of one of said flights and engage said opening whereby it moves with said belt and engages and advances the film unit said disengaging means comprising a releasing member which is positioned to cause release of said biased picking member from said openings and thereby terminate the film unit from advancing.

6. The apparatus of claim 5 wherein said second means includes a pair of spaced apart pressure applying rollers, a driving member coupled to at least one of said rollers and being continuously drivingly engaged by said timing belt, whereby displacement of said belt drives said one roller.

7. The apparatus of claim 2 wherein said actuator includes a frame, and first and second electromagnetic motors carried in and by said frame, said first motor including a first armature reciprocally movable generally normal to the direction of movement of said flights for purposes of alternately engaging said upper and lower flights; said second motor including a second armature reciprocally movable in a path generally parallel to the path of said upper and lower flights, said second armature being movable when said first armature is engaged with either one of said upper and lower flights.

* * * * *